United States Patent
Rowe

(10) Patent No.: US 11,794,286 B2
(45) Date of Patent: Oct. 24, 2023

(54) COPPER SOLDER FORMULATION

(71) Applicant: TOYOTA MOTOR ENGINEERING & MANUFACTURING NORTH AMERICA, INC., Plano, TX (US)

(72) Inventor: Michael P. Rowe, Pinckney, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 409 days.

(21) Appl. No.: 16/998,022

(22) Filed: Aug. 20, 2020

(65) Prior Publication Data

US 2022/0055158 A1 Feb. 24, 2022

(51) Int. Cl.
| | |
|---|---|
| B23K 35/30 | (2006.01) |
| H05B 6/80 | (2006.01) |
| B23K 35/36 | (2006.01) |
| B23K 1/005 | (2006.01) |

(52) U.S. Cl.
CPC ............ *B23K 35/302* (2013.01); *B23K 1/005* (2013.01); *B23K 35/3602* (2013.01); *H05B 6/80* (2013.01)

(58) Field of Classification Search
None
See application file for complete search history.

(56) References Cited

U.S. PATENT DOCUMENTS

| | | | | | |
|---|---|---|---|---|---|
| 3,844,027 A | * | 10/1974 | Hagen | ....................... | B23K 1/20 228/209 |
| 3,891,784 A | * | 6/1975 | Allardyce | ............... | C23C 10/20 228/183 |
| 4,877,555 A | * | 10/1989 | Yuhaku | ................ | H01G 4/0085 106/1.23 |
| 5,035,837 A | * | 7/1991 | Saeki | ...................... | C04B 35/45 501/19 |
| 7,326,892 B1 | * | 2/2008 | Cretegny | ............... | B23K 1/005 219/679 |
| 7,569,800 B2 | | 8/2009 | Tian et al. | | |

(Continued)

FOREIGN PATENT DOCUMENTS

| | | |
|---|---|---|
| CN | 107838576 A | 3/2018 |
| RU | 2 270 743 C2 | 2/2006 |

(Continued)

OTHER PUBLICATIONS

"Selective Tinning with Powdered Solder and Microwave Radiation", Research Disclosure, No. 285001, Jan. 1988, p. 28501.

(Continued)

*Primary Examiner* — Erin B Saad
*Assistant Examiner* — Carlos J Gamino
(74) *Attorney, Agent, or Firm* — Oblon, McClelland, Maier & Neustadt, L.L.P.

(57) ABSTRACT

Bulk copper solder is highly desired as a solder compound because it is very electrically conductive and has a high melting point relative to other solders. A composition for a copper solder includes copper(II) oxide powder in the range of 37-53% by mass, silicon carbide (SiC) powder in the range of 8-14% by mass, and a flux in the range of 35%-53% by mass. Energy in the form of microwave energy can be applied to the copper solder to convert the Cu(II)O to Cu, for a Cu product conversion of >93%.

9 Claims, 4 Drawing Sheets

(56) References Cited

U.S. PATENT DOCUMENTS

| | | | |
|---|---|---|---|
| 10,390,440 B1 | 8/2019 | Lo et al. | |
| 2006/0071053 A1* | 4/2006 | Garimella | B23K 35/304 |
| | | | 228/119 |
| 2007/0251410 A1* | 11/2007 | Rissanen | B23K 1/19 |
| | | | 106/1.13 |
| 2008/0145566 A1* | 6/2008 | Cretegny | F01D 5/288 |
| | | | 427/553 |
| 2008/0217382 A1* | 9/2008 | Kim | C04B 37/003 |
| | | | 228/177 |
| 2008/0290137 A1* | 11/2008 | Budinger | B23K 1/0018 |
| | | | 228/119 |
| 2010/0193574 A1* | 8/2010 | Cretegny | B23K 1/005 |
| | | | 228/234.1 |
| 2015/0221626 A1 | 8/2015 | Motowaki et al. | |

FOREIGN PATENT DOCUMENTS

| | | | |
|---|---|---|---|
| RU | 2337799 C2 | * | 11/2008 |
| SU | 407688 A | * | 5/1974 |
| SU | 1140917 A | * | 2/1985 |

OTHER PUBLICATIONS

Mathias Nowottnick, et al., "Solder Pastes for Microwave Application", IEEE Electronics SystemIntegration Technology Conference, vol. 1, 2006, pp. 415-420.

Mathias Nowottnick, et al., "Soldering Technoloqy for 3D PCB Assemblies with Microwave Heating" IEEE International Symposium on Industrial Electronics, 2007, pp. 3273-3277.

\* cited by examiner

BACKGROUND

BACKGROUND

COPPER SOLDER FORMULATION

FIELD OF THE INVENTION

This disclosure relates to a copper solder or braze composition including copper oxides, flux, and silicon carbide for conversion of the copper oxide to copper metal under high temperature heating.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Solder or braze provides structural integrity and electrical conductance when applied to electrical components. The application of the solder or braze can be partially limited by the electrical components themselves. Electrical components operating at elevated temperatures, for example at temperatures close to the glass transition temperature of some materials in the solder or braze, can cause the solder or braze to lose structural integrity, leading to dislodging of the electrical components.

For electrical conductance, copper can be considered a preferred material of choice due to its high electrical conductance. However, melting copper metal presents a challenge due to copper's high melting temperature, and copper nanoparticles present issues attributed to oxidation in the air which can lead to corrosion and loss of electrical conduction. Accordingly, a copper solder or braze composition and method of forming the copper metal solder or braze without oxidation at the electrical component junction is desired.

SUMMARY

The present disclosure relates to a copper solder or braze composition, comprising, based on a total mass percent of the copper solder or braze composition: copper(II) oxide powder in the range of 37-53% by mass, silicon carbide (SiC) powder in the range of 8-14% by mass, and a flux in the range of 35%-53% by mass.

The present disclosure additionally relates to a method of converting a copper solder or braze composition to copper metal, comprising: mixing the copper solder or braze composition including copper(II) oxide powder in the range of 37-53% by mass, silicon carbide (SiC) powder in the range of 8-14% by mass, and a flux in the range of 35%-53% by mass; and heating the copper solder or braze composition using a microwave energy source emitting microwave radiation sweeping from 5.85 GHz to 6.65 GHz frequency.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figures 1A, 1B:
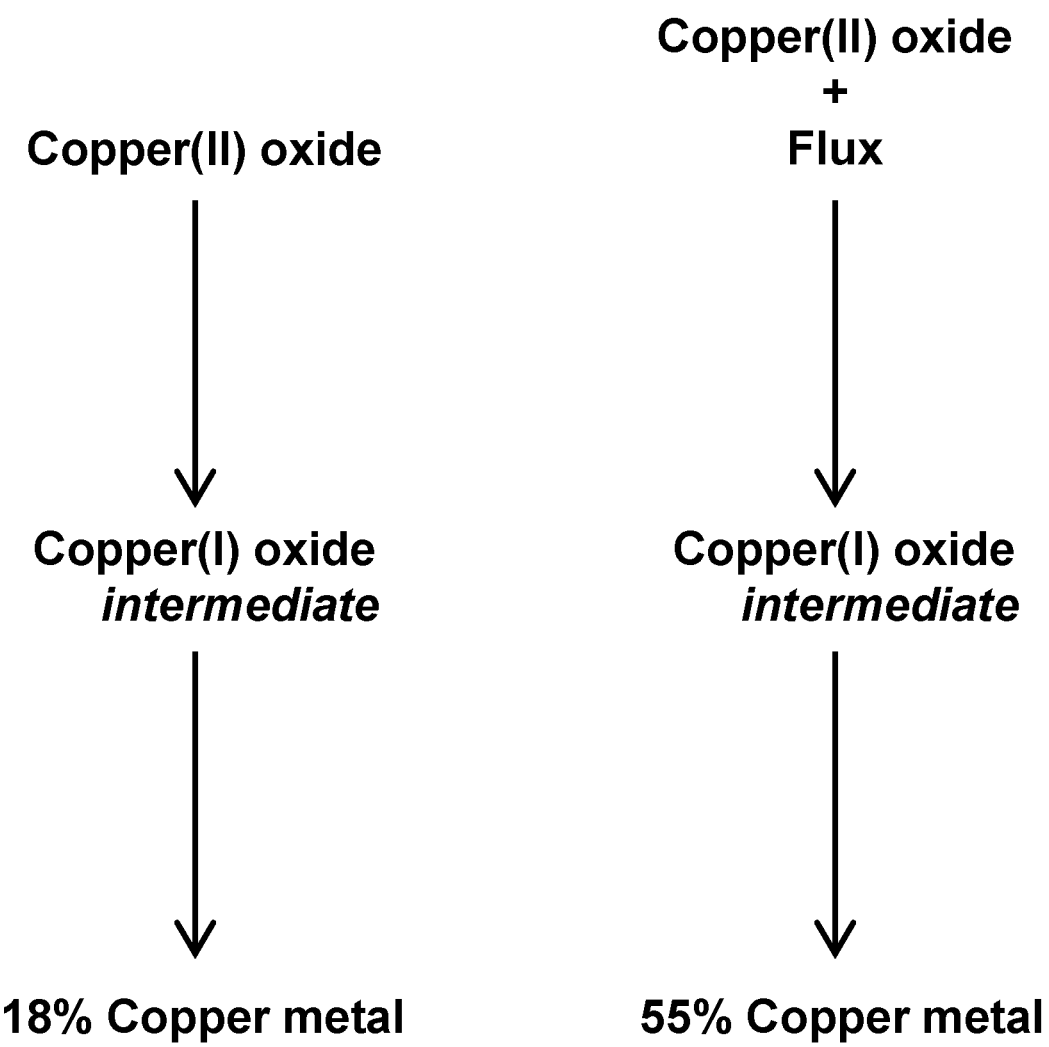
FIG. 1A shows an example process flow of copper(II) oxide to copper metal conversion.
FIG. 1B shows an example process flow of copper(II) oxide with flux to copper metal conversion.

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one aspect of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more aspects. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "top," "bottom," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Bulk copper solder or braze is highly desired as a solder or braze composition because it is very electrically conductive and has a high melting point relative to other solders or brazes. According to one embodiment discussed herein, a copper solder or braze composition includes copper(II) oxide powder in the range of 37-53% by mass; silicon carbide (SiC) powder in the range of 8-14% by mass; and a flux in the range of 35%-53% by mass. Energy in the form of microwave energy may be applied to the copper solder or braze composition to convert the Cu(II)O to Cu, for a Cu product conversion of >93%. Using either more (>14% by mass) or less (<8% by mass) of the SiC can lower the Cu(II)O to Cu conversion appreciably, but at the optimum composition of 10% SiC by mass, 50% flux by mass, and 40% Cu(II)O by mass, can achieve 100% conversion to Cu metal under microwave conditions.

FIG. 1A shows an example process flow of copper(II) oxide to copper metal conversion. In an embodiment, copper (II) oxide can have a large microwave cross section. That is, copper(II) oxide can absorb a large amount of microwave radiation, wherein the cross section is defined as the measure of the probability that particle-particle interactions occur in a particular material (e.g. absorbs, scatters, etc.). As shown, converting from copper(II) oxide to copper metal proceeds through a two-stage process where the copper(II) oxide is first converted to copper(I) oxide, such as when heat is applied. The heat applied can be via, for example, microwave energy. However, copper(I) oxide can have a small microwave cross section. As the conversion proceeds from the first stage to the second stage, the copper(II) oxide converts into copper(I) oxide, and the small microwave cross section of the copper(I) oxide absorbs less microwave energy. As less microwave energy is absorbed by the copper (I) oxide, the copper(I) oxide decreases in temperature and conversion to copper metal decreases, or stops altogether if the temperature of the copper(I) oxide becomes sufficiently low. Thus, any copper metal that forms is formed from residual heat that helped push the copper(I) oxide to the copper metal stage. In the application of soldering or brazing electrical components, small volumes of solder or braze are used to solder joints, which results in even faster cooling of the copper(I) oxide at the intermediate stage as compared to a large bulk reaction. As shown, a typical yield for copper metal converted from copper(II) oxide via the copper(I) oxide intermediate can be approximately 18%.

FIG. 1B shows an example process flow of copper(II) oxide with flux to copper metal conversion. As described before, the copper(II) oxide can be converted to copper(I) oxide where decreased absorption of microwave energy in the copper(I) oxide causes the conversion to slow. This can be exacerbated by the presence of oxygen contributing to additional oxidation around the reaction locally. Solder or braze can be prevented from adequately wetting a joint in the presence of a metal oxide coating. Thus, a flux can be used in combination with the copper(II) oxide to reduce or remove unwanted oxidation at the joint and increase the yield of the copper metal and its effective soldering to the joint. As shown, a typical yield for copper metal converted from copper(II) oxide combined with flux via the copper(I) oxide intermediate can be approximately 55%. Here, flux can be understood to mean any chemical agent known by those in the art to remove oxidation, prevent airflow to the joint, and prevent further oxidation at the joint during soldering or brazing, especially as applied to the fields of automotive, appliances, machinery, electrical component manufacturing, semiconductor fabrication, and more. For example, the flux can be a rosin flux, an organic acid flux, or an inorganic acid flux. In one embodiment, the flux is a silver brazing flux active and protective to 870° C. and used for copper and copper-based alloys.

In view of the aforementioned, an additional component is desired to maintain a high operating temperature for the conversion of the copper(II) oxide to the copper metal. As described herein, a copper solder or braze composition including flux and silicon carbide can provide a large microwave cross section and oxidation prevention to increase the efficiency of conversion to copper metal.

Figure 2:
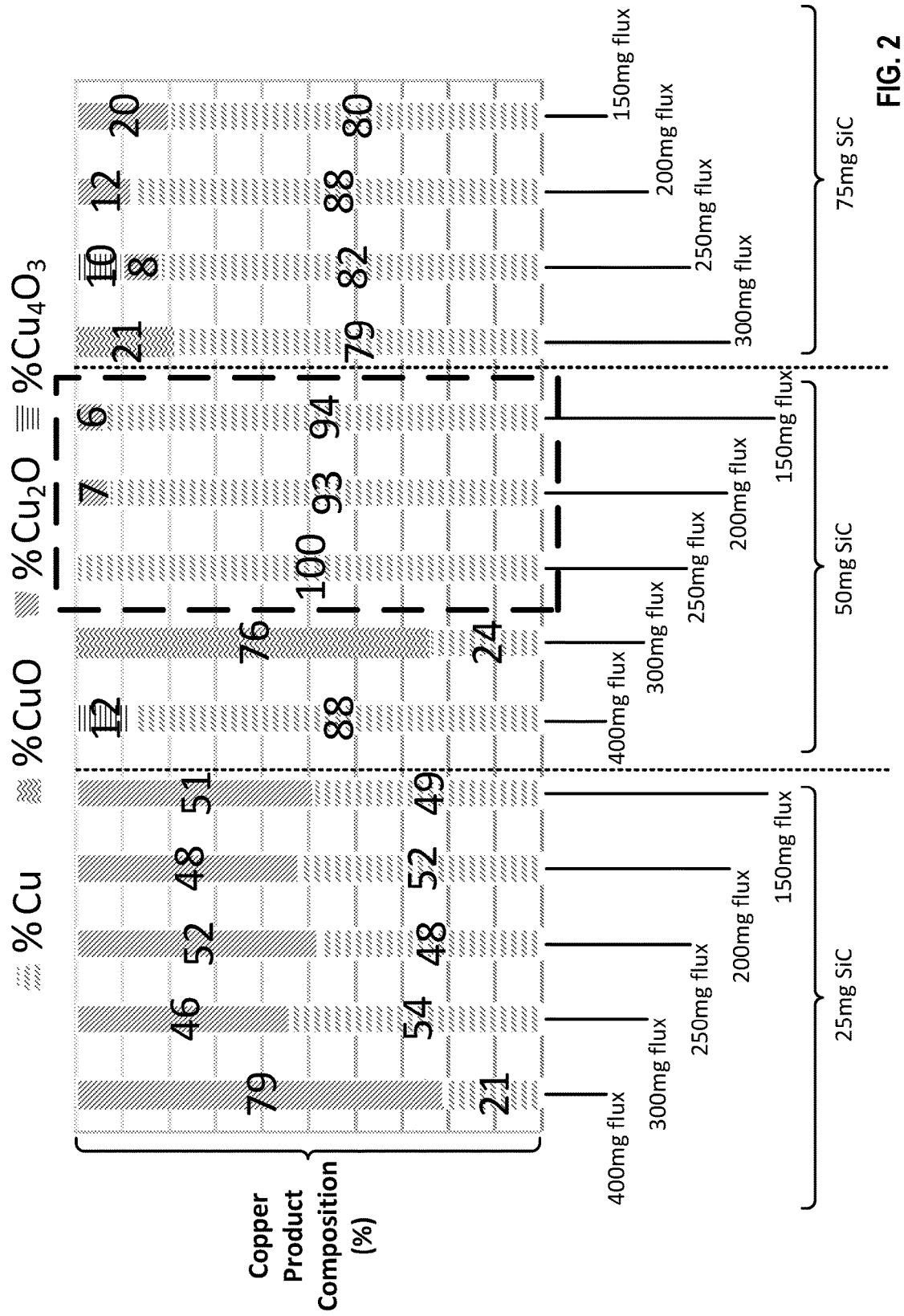
FIG. 2 shows experimental data for conversion of copper solder or braze compositions, according to an embodiment of the present disclosure.

FIG. 2 shows experimental data for conversion of copper solder or braze compositions, according to an embodiment of the present disclosure. In an embodiment, the chart shows conversion of copper(II) oxide to copper metal, wherein the starting composition includes copper(II) oxide, flux, and silicon carbide (SiC). Copper(I) oxide has a very low microwave cross section and would cool undesirably if not for the silicon carbide. The silicon carbide powder retains enough heat (and is still heated some from microwave irradiation) to carry the reduction of the copper(I) oxide intermediate to copper metal. This reduces the copper metal, soldering or brazing the electronic components in place. If the microwave cross section is not large enough, then the solder or braze will not heat to the necessary temperatures that convert copper(II) oxide to copper metal, resulting in less or no product. This was observed experimentally until the silicon carbide powder was included in the copper solder or braze composition. Without including the silicon carbide powder, the experiments would not exceed 300° C., and it was determined experimentally that copper(II) oxide would not convert well to copper metal until the temperature exceeded 600° C. Thus, microwave radiation having a frequency from 5.85 GHz to 6.65 GHz can be emitted from, for example, a Lambda Technology variable frequency microwave instrument at 1600 W energy.

In one example, along the left portion of the chart, the copper solder or braze composition comprises 200 mg of copper(II) oxide, 25 mg of silicon carbide, and a range of masses for the flux. In particular, the copper solder or braze composition comprises, based on a total mass percent of the copper solder or braze composition: copper(II) oxide powder in the range of 32-54% by mass, silicon carbide (SiC) powder in the range of 4-7% by mass, and a flux in the range of 40-64% by mass. The composition including 64% flux by mass, 32% of copper(II) oxide powder by mass, and 4% of silicon carbide powder by mass results in a 21% conversion of the copper(II) oxide to copper metal. For the compositions including 40-58% of flux by mass, the conversion to copper metal ranges from 48-54%.

In one example, along the right portion of the chart, the copper solder or braze composition comprises 200 mg of copper(II) oxide, 75 mg of silicon carbide, and a range of masses for the flux. In particular, the copper solder or braze composition comprises, based on a total mass percent of the copper solder or braze composition: copper(II) oxide powder in the range of 34-48% by mass, silicon carbide (SiC) powder in the range of 13-18% by mass, and a flux in the range of 35-53% by mass. The composition including 52% of flux by mass, 35% of copper(II) oxide powder by mass, and 13% of silicon carbide powder by mass results in a 79% conversion of the copper(II) oxide to copper metal. For the compositions including 35-48% of flux by mass, the conversion to copper metal ranges from 80-88%.

In one example, along the middle portion of the chart, the copper solder or braze composition includes 200 mg of copper(II) oxide, 50 mg of silicon carbide, and a range of masses for the flux. In particular, the copper solder or braze composition comprises, based on a total mass percent of the copper solder or braze composition: copper(II) oxide powder in the range of 30-50% by mass, silicon carbide (SiC) powder in the range of 7-13% by mass, and a flux in the range of 37-62% by mass. The composition including 50% of flux by mass, 40% of copper(II) oxide powder by mass, and 10% of silicon carbide powder by mass results in a complete 100% conversion of the copper(II) oxide to copper metal. For the compositions including 37-45% of flux by mass, the conversion to copper metal ranges from 93-94%. For the compositions including 55-62% of flux by mass, the conversion to copper metal ranges from 24-88%. The preferred aforementioned copper solder or braze compositions are highlighted by the dashed box on the chart.

In one example, the copper solder or braze composition consists of copper(II) oxide, silicon carbide, and flux. In one example, the compositions consists of copper(II) oxide powder in the range of 38-42% by mass of the solder or braze composition, the silicon carbide powder in the range of 9-11% by mass of the solder or braze composition, and the flux in the range of 48-52% by mass of the solder or braze composition.

In the aforementioned examples, any non-conversion of copper(II) oxide to copper metal resulted in residual forms of copper oxide, including CuO, $Cu_2O$, and $Cu_4O_3$. If residual copper oxide in any form remains, electrical conductivity may be reduced and structural integrity may be compromised. Thus, the preferred copper solder or braze composition resulting in low amounts of residual copper oxides may provide improved electrical conductivity and structural integrity to the solder joint.

Figure 3A:
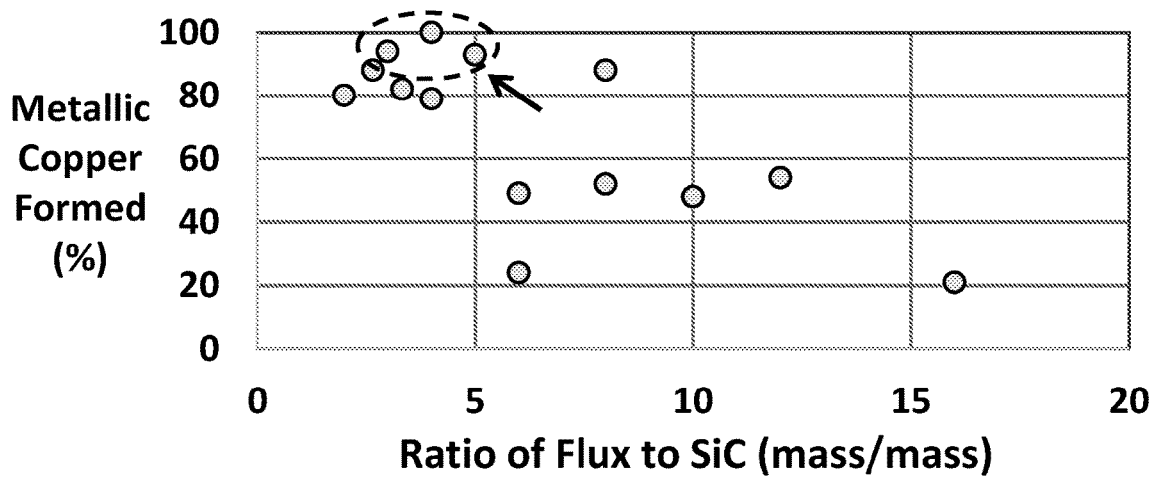
FIG. 3A shows a chart of metallic copper formed in relation to the ratio of flux to SiC, according to an embodiment of the present disclosure.

FIG. 3A shows a chart of metallic copper formed in relation to the ratio of flux to SiC, according to an embodiment of the present disclosure. Notably, it was found that the weight ratio of flux to SiC is important for good conversion of copper(II) oxide to copper metal for soldering or brazing. As highlighted via the dashed oval, a ratio of flux:SiC of 5:1 or less yielded higher percentages of metallic copper formed. Specific compositions are highlighted in the Examples below.

Figure 3B:
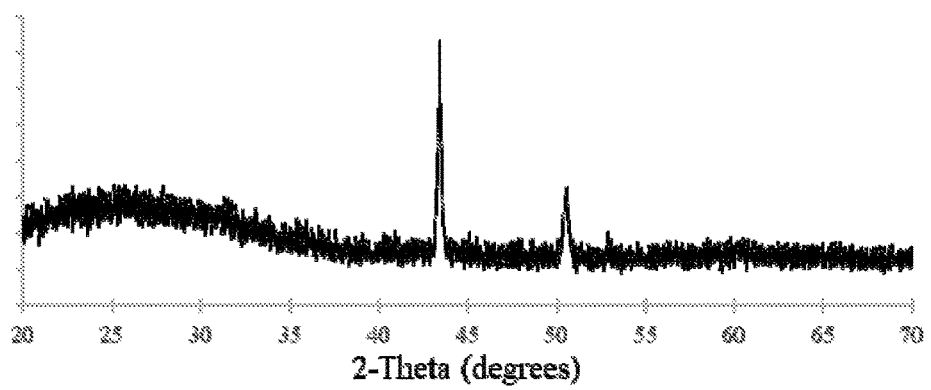
FIG. 3B shows an X-ray diffraction (XRD) plot of a converted product for the copper solder or braze composition, according to an embodiment of the present disclosure.

Example 1 and FIG. 3B shows an X-ray diffraction (XRD) plot of a converted product for the copper solder or braze composition, according to an embodiment of the present disclosure. In an embodiment, the copper solder or braze composition includes 50% of flux by mass, 40% of copper(II) oxide powder by mass, and 10% of silicon carbide powder by mass which converted entirely to copper metal. Thus, the XRD plot shows the high level of conversion to copper metal as a function of the copper solder or braze formula including silicon carbide powder in a predetermined ratio. Silicon carbide is not seen in the XRD data because the microwave conversion process of copper(II) oxide to copper metal caused the silicon carbide (and potentially the flux, based on visual inspection during experimentation) to precipitate to the surface as a crust that separated from the solder joint.

Figure 4:
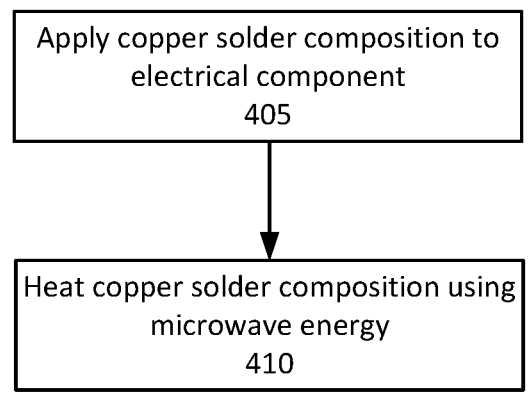
FIG. 4 shows a flow chart for a method of applying a copper solder or braze composition to an electrical component, according to an embodiment of the present disclosure.

FIG. 4 shows a flow chart for a method of applying the copper solder or braze composition, according to an embodiment of the present disclosure. In step 405, the copper solder or braze composition can be applied to an electrical component, for example an electrical component junction. In step 410, the copper solder or braze compositions can be heated using, for example, microwave energy as described herein.

EXAMPLES

Example 1—Copper Solder or Braze Composition for 100% Conversion

Copper(II) oxide powder, silicon carbide powder, and flux are mixed in a predetermined ratio and irradiated with microwave energy. The copper(II) oxide powder and silicon carbide powder have particles sizes of 10 micron and 37 micron, respectively. The flux is a brazing water-based paste flux prescribed for use on copper and is composed of potassium fluorohydroborate (20-40%), potassium tetraborate (15-25%), boric acid (30-45%) and potassium fluoroborate (7-15%). The predetermined ratio of Cu(II)O:flux:SiC is 4:5:1. The copper solder or braze composition comprises 200 mg of copper(II) oxide powder, 250 mg of flux, and 50 mg of silicon carbide powder. The mixture is homogenized via mechanical mixing. The mixture is then placed in an oven and irradiated over a microwave frequency range of 5.85 GHz to 6.65 GHz with 1600 W energy for 1 minute. The copper(II) oxide powder (micron in size) heats quickly under microwave energy up to 800° C., under a shielding flow of argon gas, and converts copper(II) oxide to copper(I) oxide with 100% conversion.

Example 2—Copper Solder or Braze Composition for 93% Conversion

Copper(II) oxide powder, silicon carbide powder, and flux are mixed in a predetermined ratio and irradiated with microwave energy. The copper(II) oxide powder and silicon carbide powder have particles sizes of 10 micron and 37 micron, respectively. The flux is a brazing water-based paste flux prescribed for use on copper and is composed of potassium fluorohydroborate (20-40%), potassium tetraborate (15-25%), boric acid (30-45%) and potassium fluoroborate (7-15%). The predetermined ratio of Cu(II)O:flux:SiC is 4:4:1. The copper solder or braze composition comprises 200 mg of copper(II) oxide powder, 200 mg of flux, and 50 mg of silicon carbide powder. The mixture is homogenized via mechanical mixing. The mixture is then placed in an oven and irradiated over a microwave frequency range of 5.85 GHz to 6.65 GHz with 1600 W energy for 1 minute. The copper(II) oxide powder (micron in size) heats quickly under microwave energy up to 800° C., under a shielding flow of argon gas, and converts copper(II) oxide to copper(I) oxide with 93% conversion.

Example 3—Copper Solder or Braze Composition for 94% Conversion

Copper(II) oxide powder, silicon carbide powder, and flux are mixed in a predetermined ratio and irradiated with microwave energy. The copper(II) oxide powder and silicon carbide powder have particles sizes of 10 micron and 37 micron, respectively. The flux is a brazing water-based paste flux prescribed for use on copper and is composed of potassium fluorohydroborate (20-40%), potassium tetraborate (15-25%), boric acid (30-45%) and potassium fluoroborate (7-15%). The predetermined ratio of Cu(II)O:flux:SiC is 4:3:1. The copper solder or braze composition comprises 200 mg of copper(II) oxide powder, 150 mg of flux, and 50 mg of silicon carbide powder. The mixture is homogenized via mechanical mixing. The mixture is then placed in an oven and irradiated over a microwave frequency range of 5.85 GHz to 6.65 GHz with 1600 W energy for 1 minute. The copper(II) oxide powder (micron in size) heats quickly under microwave energy up to 800° C., under a shielding flow of argon gas, and converts copper(II) oxide to copper(I) oxide with 93% conversion.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

Embodiments of the present disclosure may also be as set forth in the following parentheticals.

(1) A solder or braze composition, comprising: copper(II) oxide powder in the range of 37-53% by mass; silicon carbide (SiC) powder in the range of 8-14% by mass; and a flux in the range of 35%-53% by mass, each relative to a total mass of the solder or braze composition.

(2) The composition of (1), wherein the copper(II) oxide powder is in the range of 38-42% by mass of the solder or braze composition, the silicon carbide powder is in the range of 9-11% by mass of the solder or braze composition, and the flux is in the range of 48-52% by mass of the solder or braze composition.

(3) The composition of (1), wherein the copper(II) oxide powder is in the range of 44-45% by mass of the solder or braze composition, the silicon carbide powder is in the range of 11-12% by mass of the solder or braze composition, and the flux is in the range of 44-45% by mass of the solder or braze composition.

(4) The composition of (1), wherein the copper(II) oxide powder is in the range of 48-52% by mass of the solder or braze composition, the silicon carbide powder is in the range of 12-13% by mass of the solder or braze composition, and the flux is in the range of 37-38% by mass of the solder or braze composition.

(5) The composition of any one of (1) to (4), wherein the solder or braze compound is heated using a microwave energy source.

(6) The composition of (5), wherein the microwave energy source emits microwave radiation ranging in frequency from 5.85 GHz to 6.65 GHz.

(7) The composition of (6), wherein greater than 90% of the copper(II) oxide powder is converted to copper metal.

(8) The composition of any one of (1) to (7), wherein the composition consists of copper(II) oxide, silicon carbide, and flux.

(9) The composition of (8), wherein the compositions consists of copper(II) oxide powder in the range of 38-42% by mass of the solder or braze composition, the silicon carbide powder in the range of 9-11% by mass of the solder or braze composition, and the flux in the range of 48-52% by mass of the solder or braze composition.

(10) A method of soldering or brazing with a copper solder or braze, comprising: applying a copper solder or braze composition to an electrical component junction, the copper solder or braze composition comprising copper(II) oxide powder, silicon carbide (SiC) powder, and a flux; and heating the copper solder or braze composition using a microwave energy source emitting microwave radiation to form a molten copper solder or braze at the electrical component junction.

(11) The method of (10), wherein the copper solder or braze composition comprises copper(II) oxide powder in the range of 37-53% by mass, silicon carbide (SiC) powder in the range of 8-14% by mass, and a flux in the range of 35%-53% by mass, each relative to a total mass of the copper solder or braze composition.

(12) The method of either (10) or (11), wherein the microwave radiation has a frequency in a range of 5.85 GHz to 6.65 GHz.

(13) The method of any one of (10) to (12), wherein greater than 90% of the copper(II) oxide powder is converted to copper metal.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

What is claimed is:

1. A composition, comprising:
   copper(II) oxide powder in the range of 37-53% by mass;
   silicon carbide (SiC) powder in the range of 8-14% by mass; and
   a flux in the range of 35%-53% by mass, each relative to a total mass of the composition.

2. The composition of claim 1, wherein the copper(II) oxide powder is in the range of 38-42% by mass of the composition, the silicon carbide powder is in the range of 9-11% by mass of the composition, and the flux is in the range of 48-52% by mass of the composition.

3. The composition of claim 1, wherein the copper(II) oxide powder is in the range of 44-45% by mass of the composition, the silicon carbide powder is in the range of 11-12% by mass of the composition, and the flux is in the range of 44-45% by mass of the composition.

4. The composition of claim 1, wherein the copper(II) oxide powder is in the range of 48-52% by mass of the composition, the silicon carbide powder is in the range of 12-13% by mass of the composition, and the flux is in the range of 37-38% by mass of the composition.

5. The composition of claim 1, wherein the composition is heated using a microwave energy source.

6. The composition of claim 5, wherein the microwave energy source emits microwave radiation ranging in frequency from 5.85 GHz to 6.65 GHz.

7. The composition of claim 6, wherein greater than 90% of the copper(II) oxide powder is converted to copper metal.

8. The composition of claim 1, wherein the composition consists of the copper(II) oxide powder, the silicon carbide powder, and the flux.

9. The composition of claim 8, wherein the composition consists of copper(II) oxide powder in the range of 38-42% by mass of the composition, the silicon carbide powder in the range of 9-11% by mass of the composition, and the flux in the range of 48-52% by mass of the composition.

* * * * *